US009589745B2

(12) United States Patent
Kondou et al.

(10) Patent No.: US 9,589,745 B2
(45) Date of Patent: Mar. 7, 2017

(54) POWER CORD HAVING THERMAL SENSOR

(71) Applicant: PANASONIC CORPORATION, Osaka (JP)

(72) Inventors: Maki Kondou, Mie (JP); Takashi Kawamoto, Mie (JP); Ryota Tomiyama, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 667 days.

(21) Appl. No.: 13/957,742

(22) Filed: Aug. 2, 2013

(65) Prior Publication Data

US 2014/0070629 A1    Mar. 13, 2014

(30) Foreign Application Priority Data

Sep. 11, 2012 (JP) .................. 2012-199897

(51) Int. Cl.
| | |
|---|---|
| H01H 9/54 | (2006.01) |
| H01R 13/66 | (2006.01) |
| H01R 13/713 | (2006.01) |
| H01R 24/30 | (2011.01) |
| H02H 5/04 | (2006.01) |
| H01R 103/00 | (2006.01) |

(52) U.S. Cl.
CPC ........... *H01H 9/54* (2013.01); *H01R 13/6683* (2013.01); *H01R 13/7137* (2013.01); *H01R 24/30* (2013.01); *H02H 5/043* (2013.01); H01R 2103/00 (2013.01); Y10T 307/773 (2015.04)

(58) Field of Classification Search
CPC .................. H01R 13/6683; H01R 13/7137
See application file for complete search history.

(56) References Cited

U.S. PATENT DOCUMENTS

2007/0139842 A1    6/2007  De'Longhi

FOREIGN PATENT DOCUMENTS

| | | | |
|---|---|---|---|
| GB | 2474245 | | 4/2011 |
| JP | 50-20188 | | 3/1975 |
| JP | 08037060 | A  * | 2/1996 |
| JP | 8-275379 | | 10/1996 |
| JP | 09-223286 | | 8/1997 |
| JP | 11-144813 | | 5/1999 |

(Continued)

OTHER PUBLICATIONS

JP 09-223286 English machine translation.*

(Continued)

*Primary Examiner* — Fritz M Fleming
*Assistant Examiner* — David Shiao
(74) *Attorney, Agent, or Firm* — Greenblum & Bernstein, P.L.C.

(57) ABSTRACT

A power cord includes a plug having blades and a thermal sensor configured to detect a temperature, and a cut-off means configured to stop electric power from being supplied to the load connection portion from the blades when a temperature detected with the thermal sensor is higher than a prescribed temperature. The plug includes a core which retains the blades and the thermal sensor, and an enclosure which is formed by molding synthetic resin to cover an outside of the core. A part of the thermal sensor protrudes from the core to be buried in the enclosure.

2 Claims, 4 Drawing Sheets

(56) References Cited

FOREIGN PATENT DOCUMENTS

| | | |
|---|---|---|
| JP | 2002-352635 | 12/2002 |
| JP | 4031026 | 10/2007 |
| JP | 2009-043509 | 2/2009 |
| JP | 2009-59569 | 3/2009 |
| JP | 2009-093826 | 4/2009 |
| JP | 2012-164461 | 8/2012 |
| WO | 2009/019801 | 2/2009 |

OTHER PUBLICATIONS

Search report from E.P.O., mail date is Jan. 21, 2014.
U.S. Appl. No. 13/972,334 to Maki Kondou et al., filed Aug. 21, 2013.
Japan Official Action received in Appl. No. 2012-199897, dated Apr. 5, 2016.

* cited by examiner

POWER CORD HAVING THERMAL SENSOR

TECHNICAL FIELD

The invention relates to a power cord.

BACKGROUND ART

Japanese Patent No. 4031026 (JP4031026B) discloses a power cord including a plug, a thermal sensor, and a cut-off means. The plug is configured to be connected to an electrical outlet (or socket). The thermal sensor is configured to detect (measure) a temperature of the plug. The thermal sensor is arranged between blades of the plug. The cut-off means is configured to stop electric power from being supplied from the plug side to a load side when an abnormal rise in temperature is detected with the thermal sensor.

In this sort of power cord, even in the case of abnormal heat generation due to short circuit (tracking phenomenon) occurring between the blades through e.g., the dust accumulated therebetween, it is possible to protect the plug from the abnormal heat by stopping electricity feeding.

In the power cord described above, the plug includes a core and an enclosure. The core retains the blades and the thermal sensor. The enclosure is formed from synthetic resin by molding so as to cover the lateral sides and the rear side of the core. The thermal sensor is fitted in a recess of the core, and thereby the thermal sensor is retained by the core.

However, in this conventional power cord, there is a concern that in the case where the thermal sensor is retained with the thermal sensor and an inner face of the recess spaced, the temperature detected with the thermal sensor is lower than an actual temperature of a region between the blades, thereby impairing safety.

DISCLOSURE OF INVENTION

The present invention is developed in view of the above circumstances, and it is an object of the invention to provide a power cord capable of improving safety.

A power cord of the invention includes: a plug; a load connection portion; and a cut-off means. The plug includes: blades configured to be inserted into blade insertion holes of an electrical outlet, respectively; and a thermal sensor configured to detect a temperature. The load connection portion is configured to be connected to a load. The cut-off means is configured to stop electric power from being supplied to the load connection portion from the blades when a temperature detected with the thermal sensor is higher than a prescribed temperature. The plug further includes: a core which retains the blades and the thermal sensor; and an enclosure which is formed by molding synthetic resin to cover an outside of the core. A part of the thermal sensor protrudes from the core to be in contact with the enclosure.

In the invention, it is possible to improve safety in comparison with the case where the thermal sensor is provided so as not to be in contact with the enclosure.

DESCRIPTION OF EMBODIMENT

Figure 1:
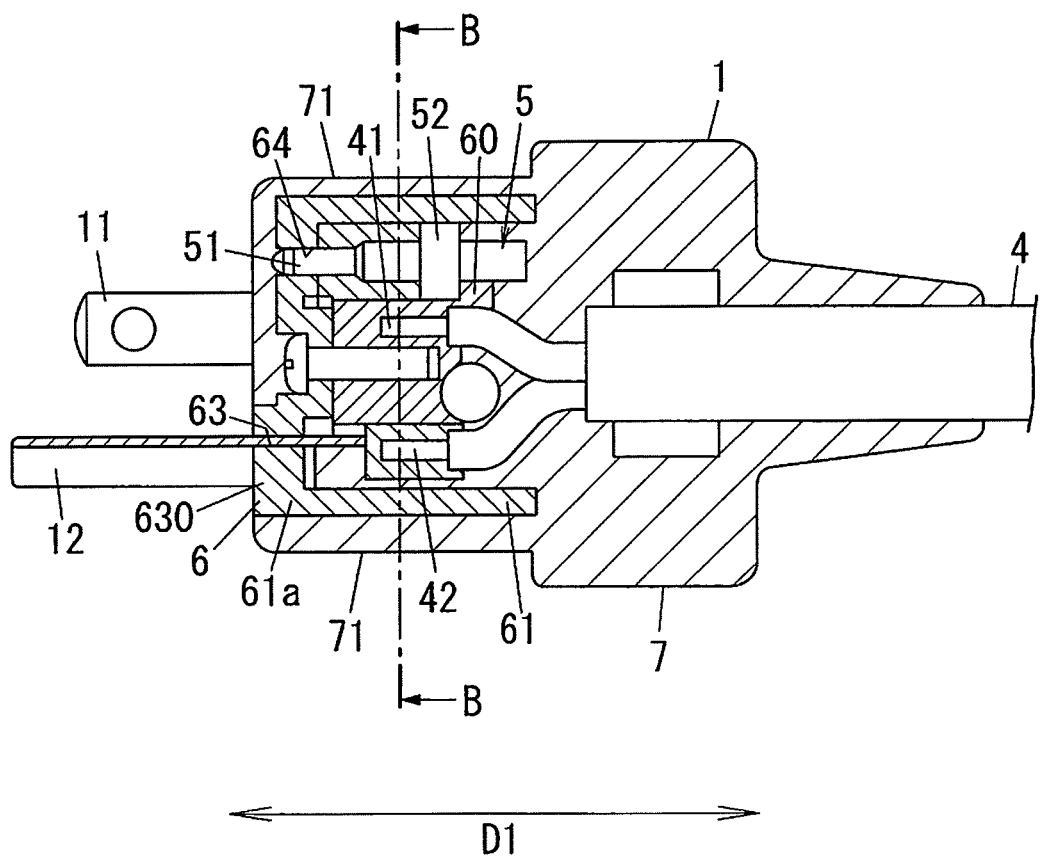
FIG. 1 is a sectional view of a plug according to an embodiment of the invention.

A power cord 100 of the present embodiment includes a plug (a male plug) 1, a load connection portion 2 and a cut-off means 3. The plug 1 includes male connectors 11 and a thermal sensor 5. The male connectors 11 are configured to be inserted into apertures 201 of an electrical outlet (socket) 200, respectively. The thermal sensor 5 is configured to detect (measure) a temperature of a region between the male connectors 11. The load connection portion 2 is configured to be connected to a load 300. The cut-off means 3 is configured to stop electric power from being supplied to a side of the load connection portion 2 from a side of the male connectors 11 when a temperature detected with the thermal sensor 5 is higher than a prescribed temperature. The plug 1 further includes: a core 6 which retains the male connectors 11 and the thermal sensor 5; and an enclosure 7 which is formed by molding synthetic resin to cover an outside of the core 6. A part of the thermal sensor 5 protrudes from the core 6 to be in contact with the enclosure 7.

In an example, the male connectors 11 are first and second male connectors (11a and 11b), and the apertures 201 are first and second apertures (201a and 201b). That is, the first and second male connectors (11a and 11b) are configured to be inserted into the first and second apertures (201a and 201b), respectively. In an example, the electrical outlet 200 further includes a ground (earth) aperture 202, while the plug 1 further includes a ground male connector 12 configured to be inserted into the ground aperture 202.

Figure 2:
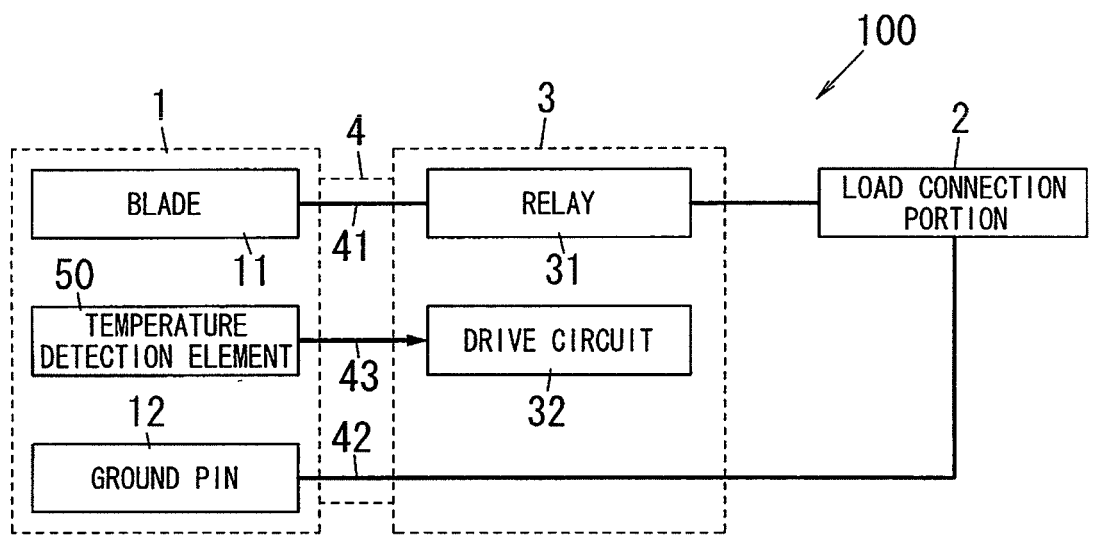
FIG. 2 is a block diagram of the plug according to the embodiment.

It is described a concrete example of a power cord 100. As shown in FIG. 2, the power cord 100 of the embodiment includes a plug 1, a load connection portion 2, and a cut-off device (cut-off means) 3. The plug 1 is configured to be connected to an electrical outlet 200. The load connection portion 2 is configured to be connected to a load 300. The cut-off device 3 is configured to allow and stop electric power from being and to be supplied to the load connection portion 2 from the plug 1.

In the embodiment, the load connection portion 2 is, for example, a connector assembly in which the cut-off device 3 is put. The connector assembly is a female plug that conforms to, but not limited to, JIS C 8303 or IEC 60320-C13 in shape. The connector assembly includes first and second receptacle contacts (not shown) in the back of first and second aperture 20 (20a) and 20 (20b) and, as an option, a ground receptacle contact (not shown) in the back of a ground aperture 21. The first and second receptacle contacts are electrically connected to the first and second male connectors (11a and 11b), respectively, and the ground receptacle contact is electrically connected to the ground male connector 12. In another example, the load connection portion 2 is electric wires connected to terminals (for example, screw terminal blocks) of the load 300. In this example, the cut-off device 3 is placed in the plug 1 or intervenes between both ends of a cable 4. Thus, the position of the cut-off device 3 is optional, and accordingly in the example of FIG. 2, the cut-off device 3 is shown separately from the load connection portion 2.

Figure 3:
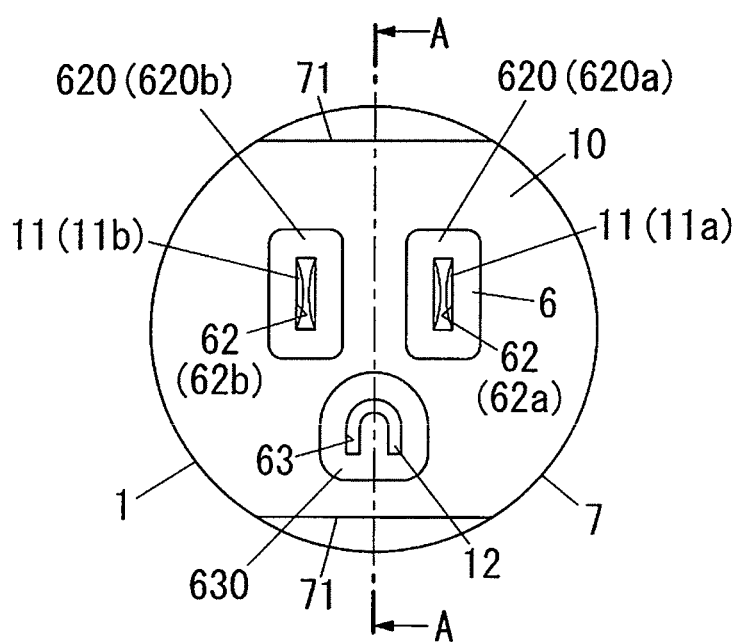
FIG. 3 is a front view of the plug according to the embodiment.
Figure 4:
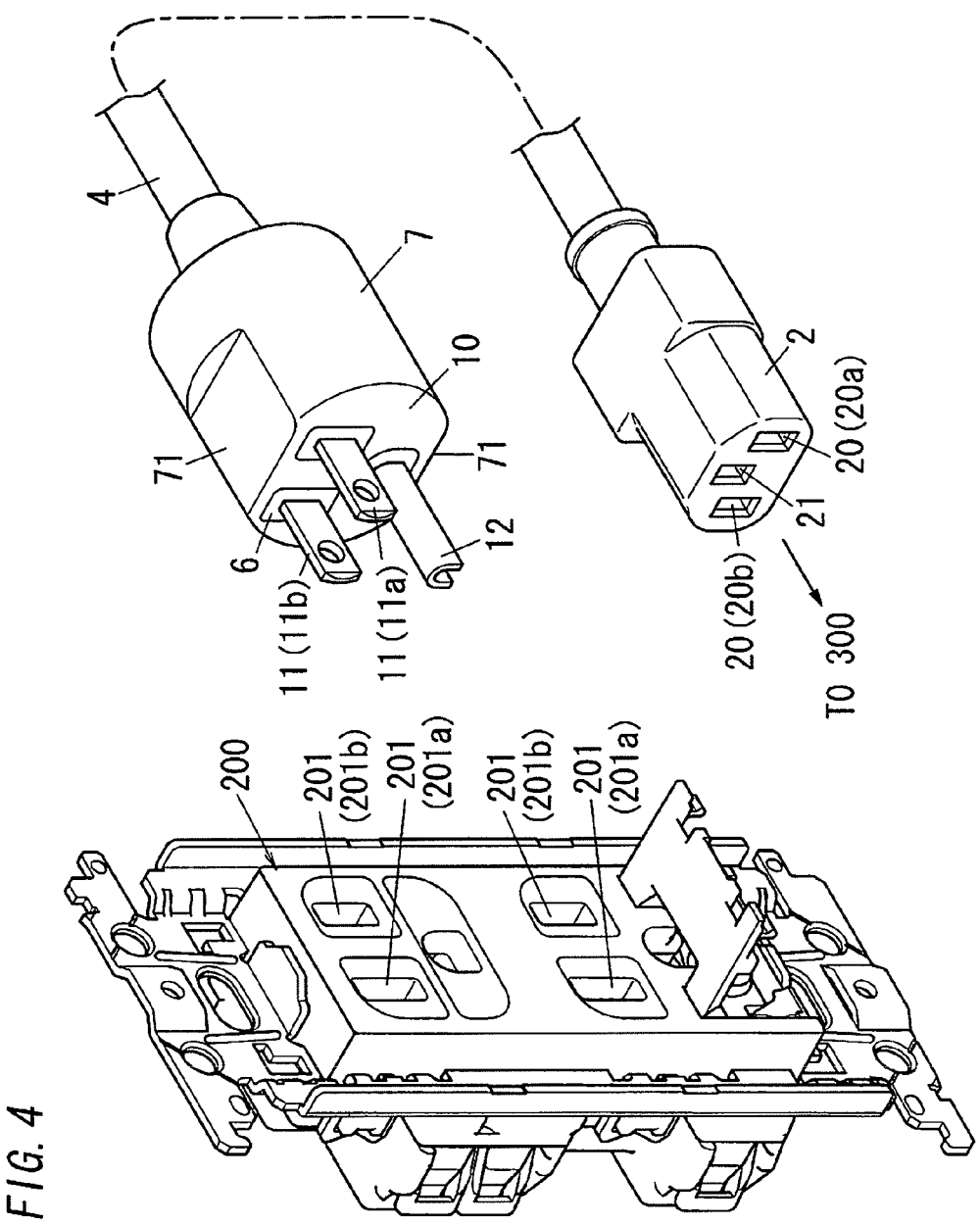
FIG. 4 is a perspective view of a power code and an electrical outlet (socket) according to the embodiment.

The plug 1 is, for example, a plug having two electrodes and a ground electrode, specified in JIS C 8303. As shown in FIGS. 3 and 4, the plug 1 includes two blades (male connectors) (11a and 11b) for power supply corresponding to line (hot) and neutral, respectively, and a ground pin (ground male connector) 12 corresponding to ground. Each of the blades 11 and the ground pin 12 is made of, for example, electrically conductive material such as metal.

The blades 11 are connected to the cut-off device 3 through power wires 41 included in the cable 4 connecting the plug 1 and the cut-off device 3. The cut-off device 3 includes a relay 31 (e.g., an electromagnetic relay) and a drive circuit 32. The relay 31 is configured to make or break an electrical connection between one or two of the blades 11 and the load connection portion 2. The drive circuit 32 is configured to drive the relay 31.

The ground pin 12 is connected to the load connection portion 2 through a ground wire 42 included in the cable 4.

Figure 5:
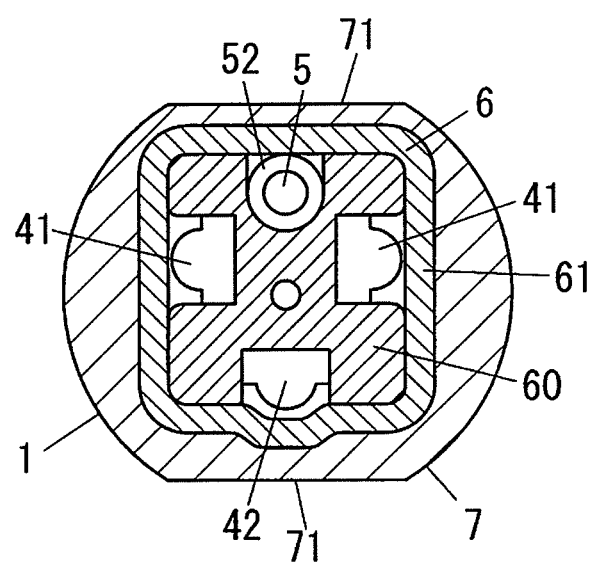
FIG. 5 is a sectional view of the plug according to the embodiment, taken along line B-B of FIG. 1.

As shown in FIGS. 4 and 5, the plug 1 includes a core 6 and an enclosure 7. The core 6 is made from an insulating material such as synthetic resin and retains the blades 11 and the ground pin 12. The blades 11 and the ground pin 12 protrude from an end face 10 of the plug 1, toward a first side of a direction D1 (see FIG. 1; for the purpose of simplicity, in the embodiment, referred to as "forward") perpendicular to the end face 10. The enclosure 7 is a synthetic resin molding in which the core 6 is sealed.

The core 6 includes an inner frame 60 and a case (front case) 61. The inner frame 60 retains the blades 11 and the ground pin 12 by engaging therewith, for example. The case 61 is shaped like a cylinder having a base (a front base) 61a on a front side and an opening (a rear opening) on a rear side in the direction D1, and the blades 11 and the ground pin 12 are inserted into the base 61a. In detail, the base 61a is provided with: first and second through holes 62 (62a) and 62 (62b) into which the blades (11a and 11b) are inserted, respectively; and (as an option) a ground through hole 63 into which the ground pin 12 is inserted. In more detail, the base 61a has, on the front surface, two bosses (protrusions) 620 (620a) and 620 (620b) on regions corresponding to the first and second apertures (201a and 201b) of the electrical outlet 200. The first and second through holes (62a and 62b) are formed on centers of the bosses (620a and 620b), respectively. The base 61a further has (as an option), on the front surface, a boss (protrusion) 630 on a region corresponding to the ground aperture 202 of the electrical outlet 200. The ground through hole 63 is formed on a center of the boss 630 (see FIGS. 1 and 3).

The enclosure 7 is shaped like a column having an axis which is in parallel with an axis of the core 6 (i.e. an axis of the case 61) as a whole. The enclosure 7 is formed by molding synthetic resin. The enclosure 7 is formed to cover the core 6 so that the front surface of the base 61a other than the front of the bosses (620a, 620b, and 630), the four side surfaces, and the rear opening of the case 61 are sealed with the enclosure 7. The lateral surface of the enclosure 7 is provided, on the front side, with a pair of recesses 71 formed in parallel with each other. The recess 71 is formed along the width of blades 11.

The plug 1 includes the thermal sensor 5. The thermal sensor 5 has a substantially rod shape extending in the direction D1 (front-rear direction). The thermal sensor 5 has an end (front end), and is configured to detect (measure) a temperature around the front end. The thermal sensor 5 is formed of a temperature detection element 50 (see FIG. 2), and a holder which is made of stainless steel and retains therein the temperature detection element 50. The temperature detection element 50 is connected to the drive circuit 32 of the cut-off device 3 through signal wires 43. An example of the temperature detection element 50 is a temperature-sensitive resistor (so called a thermistor) having a comparatively large change in resistance value in response to a temperature change.

The drive circuit 32 is configured to turn the relay 31 off when a temperature detected with the temperature detection element 50 of the thermal sensor 5 is higher than a prescribed temperature. The drive circuit 32 is also configured to keep the relay 31 turned on, namely to allow electric power to be supplied from the plug 1 side to the load connection portion 2 side when a temperature detected with the thermal sensor 5 is equal to or lower than the prescribed temperature. The aforementioned drive circuit 32 can be realized by known electronic circuits, and accordingly are not described in detail herein. For the purpose of simplicity, FIG. 2 shows only one blade 11. The relay 31 may be a single pole relay that has only one set of movable and fixed contacts intervening between one blade 11 (one power wire 41) and a corresponding one of the apertures 20 in the load connection portion 2, and is configured to turn on and off power to the load connection portion 2 (namely the load 300). Alternately, the relay 31 may be a dual pole relay that has a first set of movable and fixed contacts intervening between one blade 11 and a corresponding one of the apertures 20 in the load connection portion 2 and a second set of movable and fixed contacts intervening between another blade 11 and corresponding another aperture 20, and is configured to turn on and off power to the load connection portion 2. In addition, the relay 31 may further include a function like known circuit breakers, configured to interrupt (open) an electrical circuit in the case where a fault such as electric leakage or overcurrent is detected.

The thermal sensor 5 is provided so as to penetrate through the base 61a of the case 61. A tip of the thermal sensor 5 protrudes frontward (protrudes in the first side in the direction D1) from the base 61a, and is buried in the enclosure 7. Accordingly, the thermal sensor 5 is in contact with the enclosure 7.

In other words, the core 6 is provided with a fitting hole 64. In the embodiment, the core 6 has the fitting hole 64 pierced in the base 61a. The thermal sensor 5 has: a fitting portion 51 fitted into the fitting hole 64 at the front side of the thermal sensor 5; and a remaining part which is not inserted in the fitting hole 64. The thermal sensor 5 is configured to detect a temperature around a tip of the fitting portion 51. The enclosure 7 is in contact with the tip of the fitting portion 51 while the enclosure 7 covers all over the tip of the fitting portion 51, thereby holding the fitting portion 51.

As shown in FIG. 1, in the embodiment, the enclosure 7 holds both the tip of the fitting portion 51 and the remaining part of the thermal sensor 5. That is, the enclosure 7 is formed by molding so as to hold the front side and the rear side of the thermal sensor 5.

In detail, the thermal sensor 5 has a protrusion 52 which protrudes in the radial direction of the thermal sensor 5. The inner frame 60 engages with the protrusion 52 from behind of the thermal sensor 5 while the fitting portion 51 is fitted into the fitting hole 64, and thereby the thermal sensor 5 is positioned (retained) between the inner frame 60 and the case 61. The enclosure 7 is formed by molding under this state, thereby sealing the front part and the rear part of the thermal sensor 5.

In the configuration of the embodiment, the thermal sensor 5 detects the temperature of a region of the enclosure 7 in contact with the tip of the thermal sensor 5. As a result, it is possible to improve safety in comparison with a power cord in which a thermal sensor is not in contact with an enclosure.

The enclosure 7 is formed by molding, under a condition that the fitting portion 51 (i.e., front side) of thermal sensor 5 is fitted into the fitting hole 64 of the core 6. As a result, the power cord 100 of the embodiment has little space between the tip of the thermal sensor 5 and the enclosure 7 (i.e., the tip of the thermal sensor 5 is in contact with the enclosure 7). Accordingly, the power cord 100 of the embodiment is capable of reliably detecting a temperature of a region between the blades 11 of the enclosure 7. As a result, the power cord 100 is capable of interrupting electric current in the case of an abnormal rise in temperature of the enclosure 7 without delay, and therefore has an improved safety.

In the aforementioned embodiment, the plug 1 includes, as the first and second male connectors, two blades 11 corresponding to line (hot) and neutral, each being shaped like a rectangle having a length (protruding length) and a width and arranged so that width directions of which are parallel with each other (see FIG. 4), such as JIS C 8303 plug, NEMA 1-15 plug, NEMA 5-15 plug or the like, but the present invention is not limited to this. For example, the plug of the present invention may include as the first and second male connectors: two blades having rectangle shapes which extend in a same plane, such as BS 1363 plug or the like; two blades forming a V-shape or an upside down V-shape, such as CPCS-CCC plug, AS/NZS 3112 plug or the like; or two round pins such as BS 546 plug, BS 4573 plug, CEE 7/4 plug, CEE 7/5 plug, CEE 7/16 plug, CEE 7/17 plug, 107-2-D1 plug, CEI 23-16/VII plug, SEV 1011 plug, IEC 60906-1 plug, TIS 166-2549 plug or the like.

In the aforementioned embodiments, the plug 1 further includes, as a ground male connector (option), a ground pin 12 which has a U-shape cross-section (see FIG. 4), but the present invention is not limited to this. For example, the plug of the present invention may include as ground connector: two ground (earth) contacts put in recesses of the plug such as CEE 7/4 plug or the like; a ground blade such as AS/NZS 3112 plug, BS 1363 plug or the like; a half round ground pin such as 107-2-D1 plug or the like; or a round ground pin such as CEI 23-16/VII plug, SEV 1011 plug, NEMA 5-15 plug, TIS 166-2549 plug or the like.

The invention claimed is:

1. A power cord, comprising:
   a plug comprising blades configured to be inserted into blade insertion holes of an electrical outlet, respectively, and a thermal sensor configured to detect a temperature;
   a load connector configured to be connected to a load; and
   a cut-off switch configured to stop electric power from being supplied to the load connector from the blades when a temperature detected with the thermal sensor is higher than a prescribed temperature,
   wherein the plug further comprises: a core which retains the blades and the thermal sensor; and an enclosure which is formed by molding synthetic resin to cover an outside of the core,
   wherein the core includes: an inner frame retaining the blades; and a case,
   wherein the case is shaped like a cylinder having a base on a front side and an opening on a rear side, and the base is provided with through holes into which the blades are inserted,
   wherein the base of the case is provided with a fitting hole, and the thermal sensor has a fitting portion fitted into the fitting hole,
   wherein the thermal sensor penetrates through the base of the case, and a tip of the fitting portion of the thermal sensor protrudes from the base and is buried in contact with the enclosure.

2. The power cord of claim 1,
   wherein the thermal sensor is configured to detect a temperature around a tip of the fitting portion, and
   wherein the enclosure is in contact with the tip of the fitting portion while the enclosure covers all over the tip of the fitting portion.

* * * * *